United States Patent [19]

Otto

[11] Patent Number: 5,452,744
[45] Date of Patent: Sep. 26, 1995

[54] VALVE FOR WATER SYSTEM

[75] Inventor: Frank J. Otto, Island Lake, Ill.

[73] Assignee: Matrix IV, Inc., Woodstock, Ill.

[21] Appl. No.: 234,342

[22] Filed: Apr. 29, 1994

[51] Int. Cl.⁶ .................................................. F16K 11/06
[52] U.S. Cl. .................. 137/625.29; 137/625.24
[58] Field of Search ............. 137/625.29, 625.24, 137/625–647

[56] References Cited

U.S. PATENT DOCUMENTS

| | | | |
|---|---|---|---|
| 1,344,490 | 6/1920 | Downie | 137/625.47 X |
| 4,105,555 | 8/1978 | Pease | 137/625.29 X |
| 4,271,020 | 6/1981 | Van Meter | 137/625.29 X |
| 4,278,109 | 7/1981 | Ortega | 137/625.24 X |
| 4,869,817 | 9/1989 | Mendoza et al. | 137/625.29 X |

Primary Examiner—John C. Fox
Attorney, Agent, or Firm—Mathew R. P. Perrone, Jr.

[57] ABSTRACT

A valve for use with a water filtration system has a housing and a piston contained therein. The piston has a bypass position, a shut-off position, an inservice position, and a back-flush function in relation to the housing. These functions are accomplished by maneuvering a cylinder inside a housing in a manual fashion with the appropriate handle. The housing has various ports which contact various apertures within the cylinder to provide for such a flow.

18 Claims, 5 Drawing Sheets

VALVE FOR WATER SYSTEM

This invention relates to a valve for a water filtration system, and more particularly to a valve for a water filtration system, capable of setting the filtration system to four different positions of use.

BACKGROUND OF THE INVENTION

It is well-settled that water is critical to life on this planet. Providing a suitable source of water is critical to both personal health and industrial health. Potable water is essential to life. Potable water with a pleasing taste adds to the quality of life.

Water is also useful for recreational purposes. Use of water for these purposes requires a good quality of water. Sometimes, the recreational use can even have health advantages. For example, swimming is both recreational and good exercise. A water spa is both relaxing and a good treatment for sore muscles and other ailments.

Due to concerns of health, taste and other functions, many people now treat their water or have special bottled water brought into the home for cooking or drinking. When installing an exchange system or filtering system for home water systems, it must be remembered that it is not always desirable to use the water that has been passed through the exchange system or filtering assembly.

It is sometimes desirable to use the untreated water. Typical examples of uses for the untreated water include, but are not limited to, watering the lawn or washing the car. Therefore, a great advantage can be obtained if the filtering system can be bypassed as desired.

The filtering system exchange then is installed in the main waterline of a home or a business. In this particular matter, reference to a home can include any suitable structure, whether it is a residence or business. Water is critical for any structure used by a human.

This filtering system exchange tank system can filter all the water coming into the home or used for recreational purposes. In the event of a tank leakage, it is necessary to shut off all water unless the valve accommodates removal of the cylinder without loss of water flow. This complete loss of water service is undesirable.

Yet the installation of the exchange system for a home water system sometimes causes great difficulty in achieving this matter. It is always possible to install a very complicated combination of a separate bypass valve and a separate shut-off valve, which greatly complicates the installation of the exchange system. With the installation of the exchange system, proper application of a multi-functional valve having a combined safety, bypass, shut-off and inservice capability can greatly reduce the cost thereof from both a labor and material standpoint.

Thus, one must give weight to the complications of the combined bypass, shut-off valve for an exchange system to avoid the application of filtered or treated water, as opposed to the desired consumption of treated water. The complicated, combined, bypass, valving system may even cause some people to either avoid the use of such treated water, when it is highly desired to have such treated water, or use such treated water when it is unnecessary.

In the U.S., States, it is common to treat public water supplies with various chemicals. These chemicals are needed to disinfect the water. This treatment is necessary to avoid adverse health effects. However, it is also possible for the treatment of the water to result in a composition; which can have many adverse reactions, especially to the health of a person and the environment in general.

For example, chlorine which is commonly used in disinfecting water can have an undesired effect on the taste or odor of the water. It is highly desired to have a filter system with a multi-functional valve operably secured thereto, which can permit the filtration of the chlorine from the water while at the same time permit the unfiltered water to be used for watering lawns or similar noncritical functions.

If the installation of a water treatment system is simplified, tremendous advantages can occur. Not only does a person receive better water for consumption, it can be more simple for that person to avoid using treated water for non-critical purposes.

Sometimes it is desired to limit the treatment of the water to a specific area. For example, if a drinking faucet is desired, such filtration must be easily adapted to that restricted use. In other words, the filtering unit must be capable of being applied to only one faucet, to be used substantially for drinking water. Such flexibility of action is difficult to achieve with only one unit.

It is also desirable to be able to back-flush a filtering mechanism on occasion. With the back-flush, the filtering medium is rearranged for more efficient use of the medium. As water flows through a filtering medium, paths are created. These paths provide for treatment of certain parts of the water on certain parts of the filtering medium.

However, these paths can become encrusted with water residue. This crust prohibits water contact with the rest of the filtering medium. With the back-flush aspect of this device, the filtering medium can be rearranged without disassembling the cylinder and the filtering assembly.

Also, such a back-flush arrangement achieves the maximum exposure of the filtering medium to the water. The back-flush permits more efficient use of the filtration medium. Yet adding this desired feature creates complications and costs far in excess of the benefits achieved by the more efficient use of the filtering medium.

These valve requirements can also be applied to the recreational uses of water and the filter assembly required therefor. Yet it is hard to adapt a valve for both purposes.

SUMMARY OF THE INVENTION

Therefore, it is an objective of this invention to provide a multi-functional valve having a combined bypass, shut-off, back-flush, and inservice capability to be applied to a water treatment system.

A further objective of this invention is to provide a multi-functional valve to minimize concern about water with regard to health.

A still further objective of this invention is to provide a multi-functional valve to minimize concern about water with regard to consumption.

Yet a further objective of this invention is to provide a multi-functional valve to minimize concern about water with regard to taste.

Also an objective of this invention is to provide a multi-functional valve to use treated water when desired.

Another objective of this invention is to provide a multi-functional valve to use untreated water when desired.

Yet another objective of this invention is to provide a simplified, multi-functional valve, which is easily installed.

Still another objective of this invention is to provide a multi-functional valve, which simplifies installation of a water treatment system.

A further objective of this invention is to provide a multi-functional valve with minimized valve leakage concern about water with regard to consumption.

A still further objective of this invention is to provide a multi-functional valve to assist the operation of a system for removing water treatment chemicals.

Yet a further objective of this invention is to provide a multi-functional valve to avoid skin reaction.

Also an objective of this invention is to provide a multi-functional valve to bypass a leaking treatment tank.

Another objective of this invention is to provide a multi-functional valve having a combined safety, bypass, shut-off, back-flush and inservice capability for a water treatment system to select when to use treated or untreated water.

Yet another objective of this invention is to provide a method for bypassing a water treatment system.

Still another objective of this invention is to provide a method for isolating a leaking water treatment system from the main water line.

A further objective of this invention is to provide a multi-functional valve used in a restricted faucet area.

A still further objective of this invention is to provide a multi-functional valve used in a recreational setting.

These and other objectives of this invention (which other objectives become clear by consideration of the specification, claims and drawings as a whole) are met by providing a valve having a housing and piston contained therein. The piston has a bypass position, a shut-off position, an inservice position, and a back-flush function; in relation to the housing. These functions are accomplished by maneuvering a cylinder inside a housing in a manual fashion with the appropriate handle. The housing has various ports which contact various apertures within the cylinder to provide for such a flow.

BRIEF DESCRIPTION OF THE DRAWINGS

Throughout the Figures of the drawings, where the same part appears in more than one figure, the same numeral is applied thereto.

DESCRIPTION OF THE PREFERRED EMBODIMENTS

Figure 1:
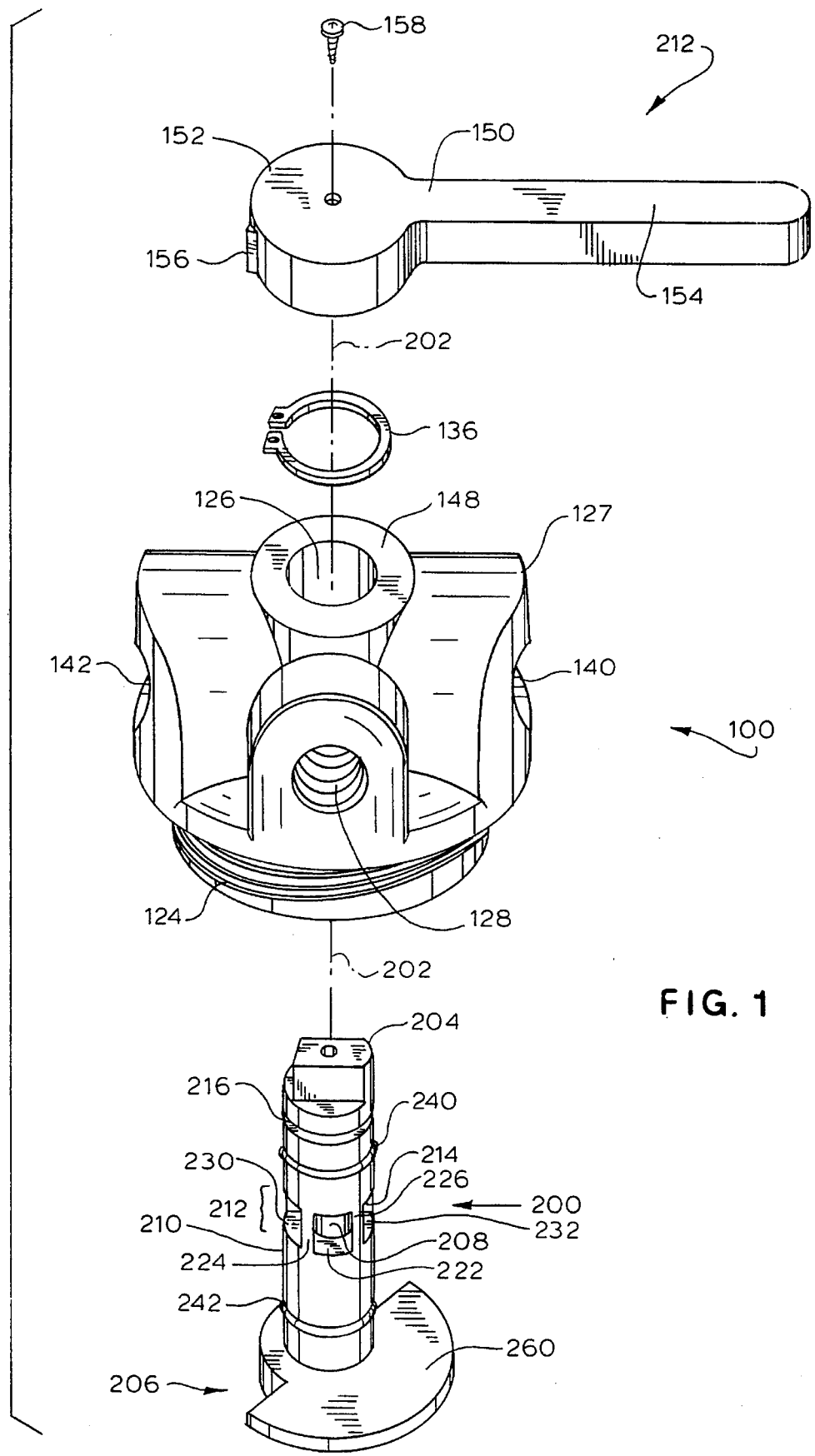
FIG. 1 depicts an exploded perspective view of the multi-functional valve 100 of this invention.

A valve for a water treatment cylinder has a housing and a piston; with the piston having a bypass position, a shut-off position, an inservice or filter position, and a back-flush function in relation to the housing. These functions are accomplished by maneuvering a cylinder of the piston inside the housing manually with the appropriate handle. The housing has various ports which contact various apertures within the cylinder to provide for such a flow.

By adjusting the fittings on this valve, the valve becomes adaptable to either recreational water use or potable water use. A larger fitting is suitable for a spa or a swimming pool. A smaller fitting can be used for a drinking water system. The fittings can be formed right in the valve housings or accomplished with an adapter.

The housing receives the piston. The piston is slidably mounted through the base of the housing and locked therein. Due to the shape of the base of the piston, the piston is positioned in the housing at its base. Due to the handle and a locking device, the piston is removably locked in the housing, so that the piston may only rotate within the housing.

Opposite the piston base, the piston is secured in the housing by means of a snap ring mounted on the piston and a handle secured to the piston. With the piston thus locked into the housing, the piston may be rotated about a usually vertical axis and move the desired valve to either its bypass function, its shut-off function, its inservice or filter function, or its back-flush or back-wash function.

The housing has a threaded portion for attaching to the valve to a cylinder containing a filter medium. Through the threaded portion and centrally located therein is a piston receiving hollow cylinder. Perpendicular to the piston receiving hollow cylinder is the back-flush port. Perpendicular to both the piston receiving port and the back-flush port is the pass through port of the valve housing.

The piston has generally or substantially cylindrical shape with a handle end and a base end oppositely disposed from the handle end. The base end communicates with the filtering mechanism or cylinder. The base end has a filter aperture protruding upwardly to a direction portion of the cylinder for the piston. The direction portion of the piston provides for a solid wall having an O-ring mounted on the outside thereof with three other apertures adjacent thereto, each designed to communicate with various upper ports in the housing. O-rings are mounted above and below the three apertures.

A platform or a flange extends outwardly from the base of the piston to thereby enlarge a portion of the base of the piston. From an edge of the piston base, approximately 180° of the base includes a ledge or the flange, which protrudes so that the lower ports of the housing may be closed as desired. The flange has a plane substantially perpendicular to the central axis of piston. The lower ports are closed depending on whether the valve is in a back-flush mode, a pass through mode, a shut-off mode, an inservice mode, or a back-wash mode. This particular structure provides for that variety of uses.

Opposite the base of the piston is the handle portion of the piston. The handle is separable from the piston. The handle portion of the piston is also shaped to receive the handle in a very strong fixed relationship. The handle may be held on the piston by means of a screw or a similar device. The housing includes a threaded portion for mounting the valve to the filter tank and a top portion oppositely disposed therefrom to which the handle may be attached.

The back-wash port centrally located in the housing is a second cylinder supported by four buttresses on the vertical central axis of the housing. The second cylinder creates four partitions in the housing, when viewed from the bottom of the cylinder. One of the partitions provides a port to communicate with the back-flush position of the valve. Another of the partitions provides a port or a channel to communicate with the inflow position of the valve and to provide also for back-flushing water through the filter. The outlet port of the housing communicates with the base of the valve only through the piston. In this fashion, the valve can be adjusted to the four desired positions.

At the threaded portion and between the upper housing is a housing O-ring for sealing the valve on the filter mechanism. The pass through ports have the same central axis and are employed in a rounded portion of the valve housing as is the back-flush port. As above stated, the piston receiving hollow cylinder is perpendicular to both the pass through port and the back-flush port. This valve is even adaptable for use with a filter used on only one faucet.

Additionally, the pass-through port is perpendicular to both the piston receiving hollow cylinder and the back-flush port. Furthermore, the central axis of the back-flush port, which itself extends only to the inner cylinder wall, can intersect at the intersection of the central axes of the pass through port and the piston axis if extended, in order to give an idea of the design of the housing. In this fashion, the desired four functions of the valve can be accomplished.

As can be seen from the drawings, the upper portion of the housing is rounded. The base of the housing, where the housing attaches to the cylinder for treating the water, includes the inner cylinder. This structure provides for an improved manufacturing process in that the housing and the piston can be more easily molded or otherwise formed.

Figure 8:
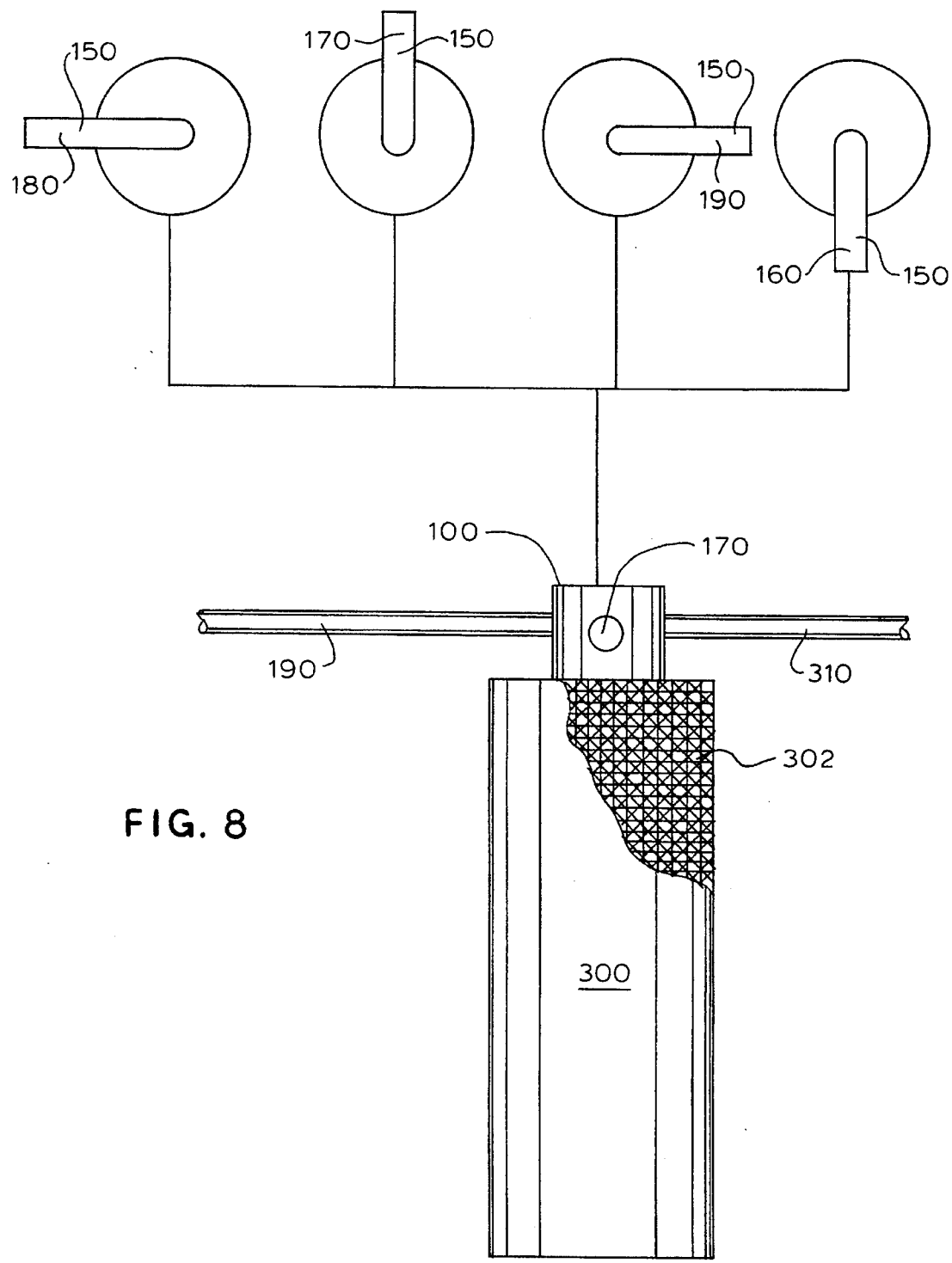
FIG. 8 depicts a perspective view of the multi-functional valve 100 of this invention mounted on a filtering cylinder 300, with an extrapolated top plan view of valve 100 showing various functions.

Referring now to FIG. 1 and FIG. 8, a valve 100 has a housing 120 and a piston 200, which cooperate to achieve desired functions for a water treatment system exemplified by filter cylinder 300. These functions are accomplished by maneuvering a cylinder 210 of the piston 200 inside the housing 120 manually with the appropriate handle 150. The housing 120 receives the piston 200. The piston 200 is locked into the housing 120 by means of a snap ring 136 mounted in locking slot 216 and the handle 150.

With the piston 200 locked into the housing 120, the piston 200 may be rotated about a usually vertical axis and moved to the desired function. For purposes of discussion, piston 200 is defined as rotating about vertical axis 202 within housing 120.

Handle 150 includes an indicator 152 and a maneuvering arm 154. The indicator 152 is a pointer showing the status of valve 100. Oppositely disposed from the indicator 152 and extending from the handle 150 is the maneuvering arm 154 for moving piston 200 in housing 120.

Figure 2:
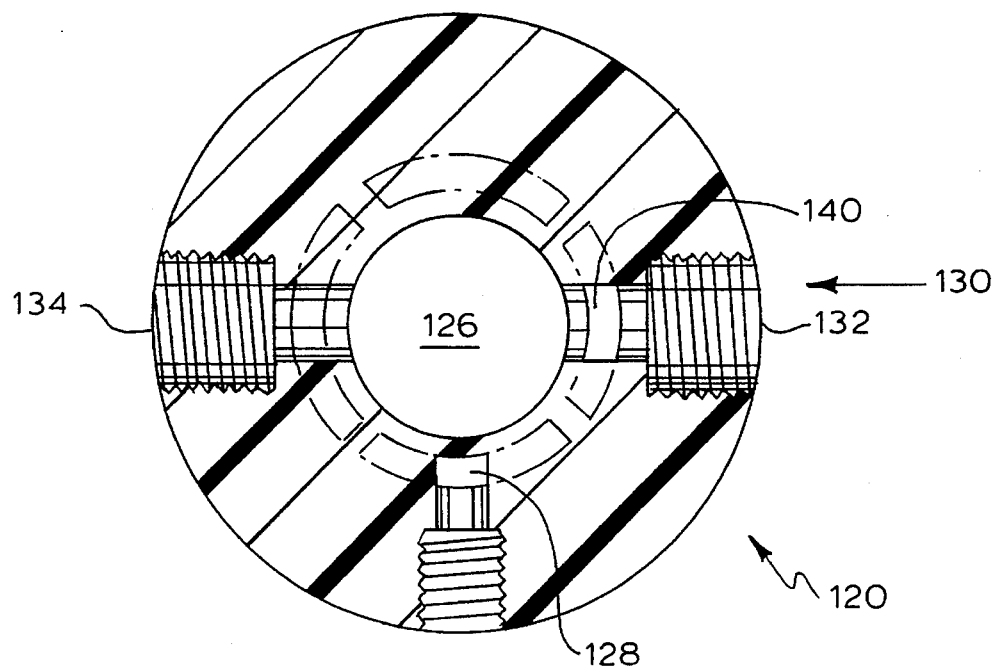
FIG. 2 depicts a top cross-sectional view of the valve housing 120 of this invention.
Figure 4:
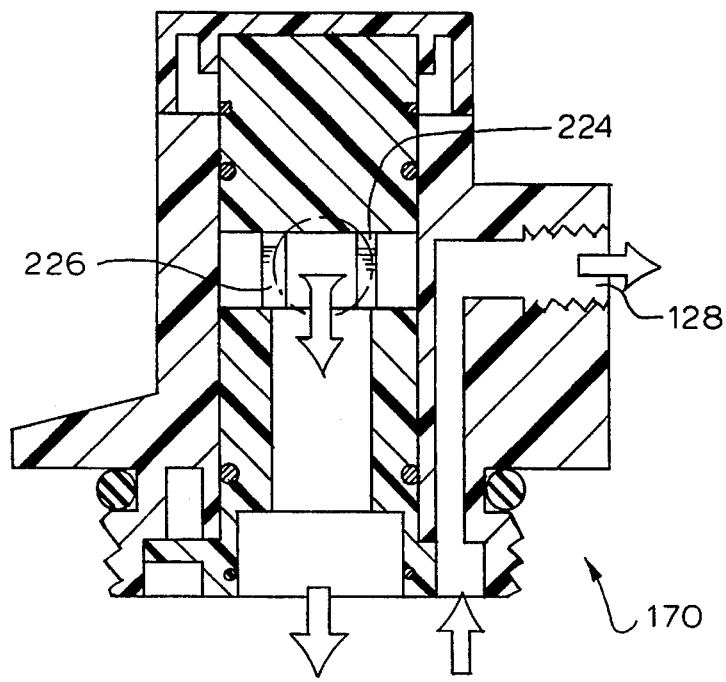
FIG. 4 depicts a side cross-sectional view of the multi-functional valve 100 showing part of the valve housing 120 and piston 200 in the back-flush position 170.
Figure 7:
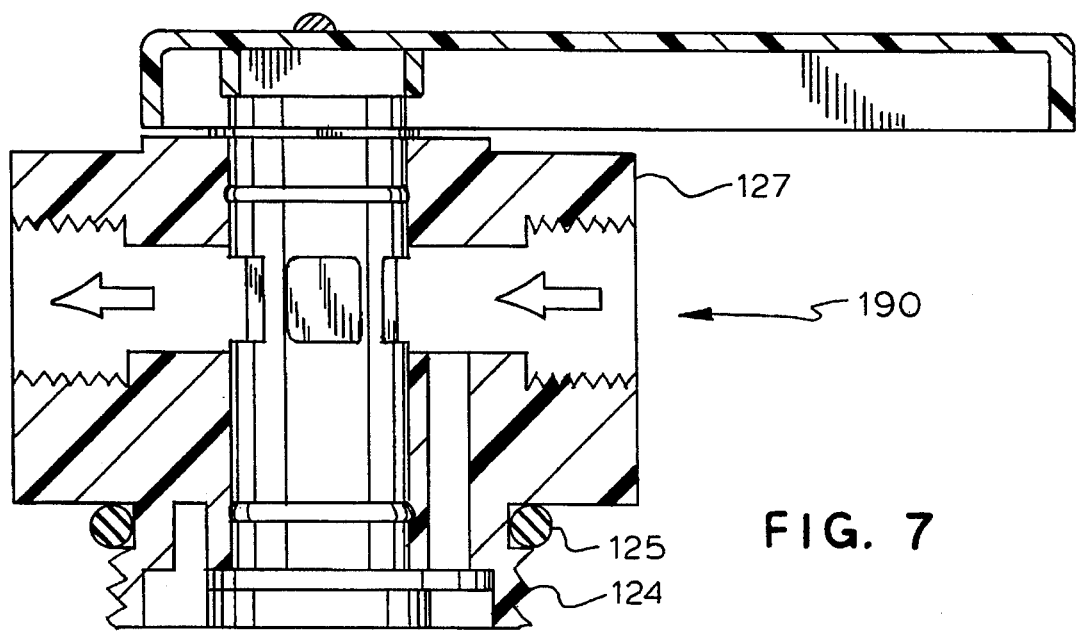
FIG. 7 depicts a pass through position 190.

Adding FIG. 2, FIG. 4 and FIG. 7 to the discussion, the housing 120 has a threaded portion 124 at its base for attaching to a cylinder 300 (shown in FIG. 8) containing a filter medium 302. The filter cylinder 300 is well-known as evidenced by the inventor's U.S. Pat. Nos. 5,139,050 and 5,107,896, incorporated herein by reference.

Through the threaded portion 124 and centrally located therein is a piston receiving hollow cylinder 126. Perpendicular to the piston receiving hollow cylinder 126 is the back-flush port 128. Perpendicular to both the piston receiving hollow cylinder 126 and the back-flush port 128 is the main water port 130 of the valve housing 120. The main water port 130 provides a straight path through housing 120, which can be interrupted by piston 200.

At a first end 132 of the main water port 130, water is admitted to housing 120. The position of piston 200 directs the water in housing 120. At a second end 134 of the main water port 130, water exits housing 120. At first end 132 is first threaded port 140. At second end 134 is second threaded port 142. Both ports 140 and 142 receive water bearing pipes 310 (shown in FIG. 8).

Figure 3:
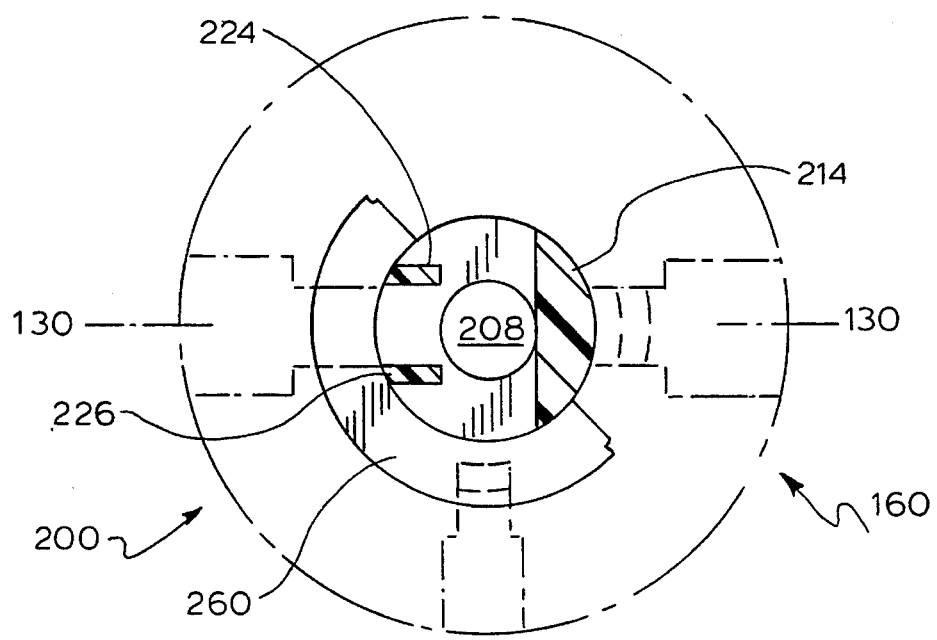
FIG. 3 depicts a bottom partially cross-sectional view of the piston 200 of the multi-functional valve 100 of this invention in closed position 160.
Figure 6:
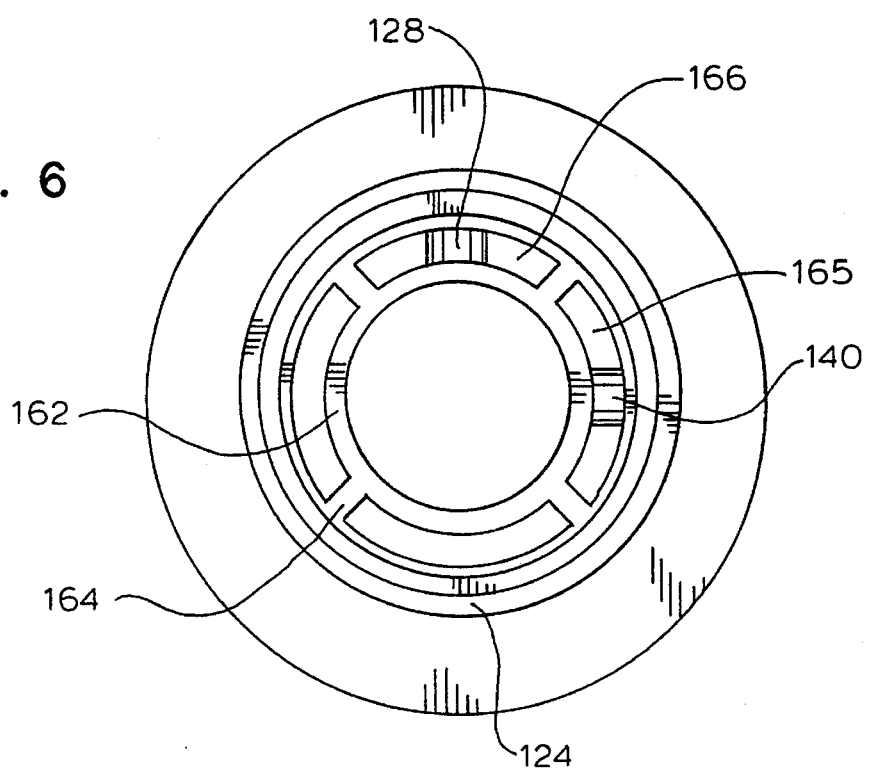
FIG. 6 depicts a bottom view of the housing 120.

The base of housing 120 is shown clearly in FIG. 3 and FIG. 6. Within threaded portion 124 can be seen the interior cylinder 162 supported in the housing 120 by four posts 164. The four posts form four slots. First slot 165 provides communication between first end 132 of the main water port 130 and the interior of threaded portion 124. Second slot 166 provides communication between back-flush port 128 and the interior of threaded portion 124. In this fashion, the valve 100 can be adjusted to the four desired positions by placing piston 200 in the desired position relative to housing 120.

At the threaded portion 124 and between the upper valve housing 127 is a housing O-ring 125 (in FIG. 7) for sealing the valve 100 on the filter mechanism such as cylinder 300. The pass through ports 140 and 142 are deployed in a rounded portion of the upper valve housing 128 as is the back-flush port 128. As above stated, the piston receiving hollow cylinder 126 is perpendicular to both the pass through ports 140 and 142 and the back-flush port 128.

Furthermore, the back-flush port 128 while extending only to the inner cylinder wall for interior cylinder 162, has a central axis, which can if extended nevertheless intersect at the intersection of the axes for the pass through ports 140 and 142 and the piston receiving hollow cylinder 126 in order to give an idea of the design of the housing 120. In this fashion, the desired four functions of the valve 100 can be accomplished.

The piston 200 has a handle end 204 and a base end 206 on the piston cylinder 210, which communicates with the filtering cylinder 300. The base end 206 has a filter port 208 protruding upwardly to a direction portion 212 of the piston 200. The direction portion 212 of the cylinder 210 of piston 200 provides for a solid wall 214 having an vertical O-ring 218 mounted on the outside thereof.

Oppositely disposed from vertical O-ring 218 is a first aperture 222 defined by a first pillar 224 and a second pillar 226. Solid wall 214 combines with first pillar 224 to form third aperture 230. Solid wall 214 also combines with second pillar 226 to form second aperture 232. Each of the three other apertures are designed to communicate with various ports in the housing 120.

O-rings are mounted above and below each aperture. First O-ring 240 is situated between first pillar 224 and locking slot 216. Second O-ring 242 is mounted around cylinder 210 and has a concentric axis therewith. It is further situated between first pillar 224 and flange 260. Vertical O-ring 218 is between first O-ring 240 and second O-ring 242 to provide the necessary sealing between housing 120 and piston 200.

A platform or flange 270 extends the base end 206 of the piston 200 to provide a flat, enlarged portion of the same. From an edge of the base end 206, flange 270 extends a sufficient distance to block or close the lower ports of the housing 120 as desired. From an edge of the base end 206, flange 270 extends outwardly approximately 180° in relation to base end 206.

Figure 5:
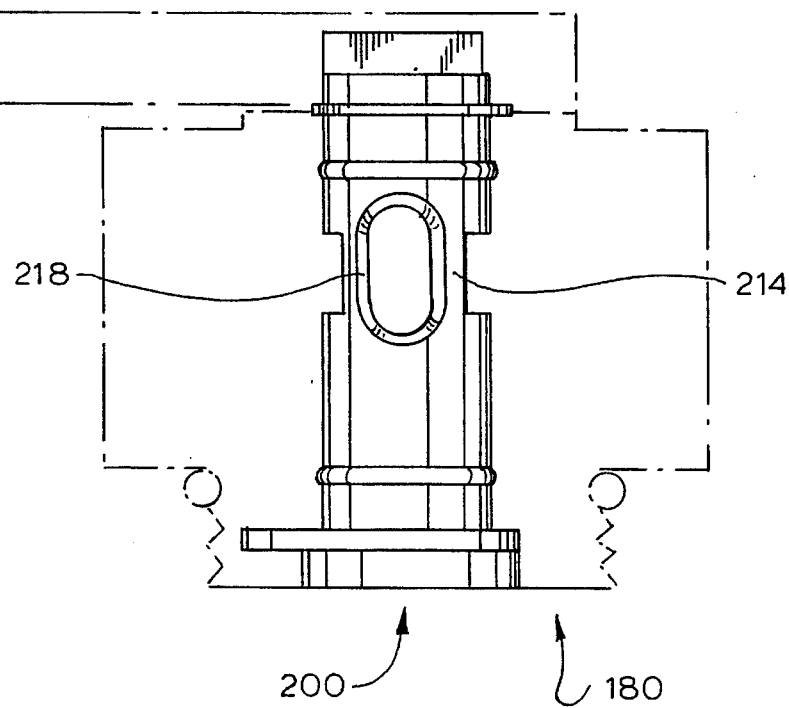
FIG. 5 depicts the piston 200 in the pass through position 190 for the multi-functional valve 100.

Various lower ports of the housing 200 are closed depending on whether the valve 100 is in a back-flushing mode of back-flush position 170, a bypass or pass through mode 190 of FIGS. 1 and 7, a shut-off mode or closed position 160 of FIG. 3, an inservice mode 180 of FIG. 5, or a back-wash mode or back-flush position 170 of FIG. 4. The modes of valve 100 are further clearly shown in FIG. 8, which indicates alternative positions for handle 150.

Opposite the threaded base 124 of the housing 120 is the base handle portion 148. The handle 150 is separable from the piston 200. The handle portion 204 of the piston 200 is also shaped to receive the handle 150 in a very strong fixed relationship. The handle 150 may be held on the piston by means of a screw 158.

Thus it may be seen housing 120 and piston 200 of valve 100 combine to provide a highly useful control mechanism for a water filtration and treatment cylinder.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A valve for a water filtration system having a housing and a piston contained within the housing, comprising:
   a) the housing having a series of ports including upper ports in a side thereof and lower ports in a base thereof;
   b) the piston having a series of apertures to cooperate with the upper ports;
   c) the piston being movable within the housing about a piston axis;
   d) the series of apertures, the series of lower ports and the series of upper ports cooperating to form a first position, a second position, a third position and a fourth position;
   e) the series of apertures including a first aperture, a second aperture, a third aperture and a fourth aperture;
   f) the series of lower ports including a first lower port, a second lower port, a third lower port and a fourth lower port;
   g) the series of upper ports including a first upper port, a second upper port, a third upper port and a fourth upper port;
   h) the first upper port, the first lower port, and the first aperture cooperating to form a first position to serve as a bypass position;
   i) the second upper port, the second lower port, and the second aperture cooperating to form a second position to serve as a shut-off position;
   j) the third upper port, the third lower port, and the third aperture cooperating to form a third position to serve as a filter position;
   k) the fourth upper port, the fourth lower port, and the fourth aperture cooperating to form a fourth position to serve as a shutoff position;
   l) the bypass position serving to cause the water filtration system to be bypassed;
   m) the shut-off position serving to cause the water filtration system to be shutoff;
   n) the filter position serving to cause the water filtration system to operate; and
   o) the back-flush function serving to cause the water filtration system to be reactivated.

2. The valve of claim 1 further comprising:
   a) the piston being rotably movable within the housing about the piston axis;
   b) the piston being movably mounted within the housing;
   c) the housing having a means to attach the valve to a filter cylinder at a housing base thereof; and
   d) the housing having a piston receiving aperture therein.

3. The valve of claim 2 further comprising:
   a) the piston receiving aperture including the piston axis;
   b) the back-flush aperture having a back-flush axis;
   c) the pass through aperture having a pass through axis; and
   d) the piston axis, the back-flush axis and the pass through axis being mutually perpendicular.

4. The valve of claim 3 further comprising:
   a) the bypass position permitting water to pass directly through the valve;
   b) the shut-off position permitting water to be stopped at the valve for service to the filter cylinder;
   c) the filter position permitting water to pass through the filter cylinder in a filtering course;
   d) the back-flush function permitting water to pass in a reverse direction of the filtering element in order to mix a filtering element in the filter cylinder and provide more exposure surface of the filtering element;
   e) the means to attach the valve to the filter cylinder being a threaded portion adjacent to the series of capable of threadably joining the valve to the filter cylinder;
   f) the piston including a directional cylinder situated substantially inside the housing;
   g) the directional cylinder including the series of apertures;
   h) a handle being secured to the piston with the piston in the housing; and
   i) the handle being secured to the piston and oppositely disposed from the threaded portion.

5. The valve of claim 4 further comprising:
   a) the piston being slidably mounted through the threaded portion of the housing;
   b) the piston being secured in the housing by a snap ring;
   c) the snap ring being mounted on the piston adjacent to the handle; and
   d) the piston being rotatable about an axis of the housing being a central axis for the means to attach the valve to a filter cylinder at a housing base thereof.

6. The valve of claim 5 further comprising:
   a) the piston having the directional cylinder with a handle end and a base end at oppositely disposed ends thereof;
   b) the base end communicating with the filtering cylinder; and
   c) the base end having a filter aperture extending to a direction portion of the directional cylinder for the piston.

7. The valve of claim 6 further comprising:
   a) the direction portion having a solid wall centrally located on the cylinder;
   b) the solid wall having a vertical O-ring mounted on the outside thereof;
   c) a first pillar and a second pillar oppositely disposed from the solid wall;

d) a first aperture being between the first pillar and the second pillar;

e) a second aperture being between the solid wall and the second pillar;

f) a third aperture being between the solid wall and the first pillar; and g) the first aperture, the second aperture, and the third aperture communicating with the filter aperture.

8. The valve of claim 7 further comprising:

a) a first O-ring being mounted above the vertical O-ring, and below and parallel to the snap ring; and b) a second O-ring being mounted below the vertical O-ring, and above the base end of the directional cylinder.

9. The valve of claim 8 further comprising:

a) a platform extending outwardly from the base of the directional cylinder to thereby form a flange on the piston thereat;

b) the flange serving to close the lower ports of the housing as desired;

c) the solid wall serving to close the upper ports of the housing as desired; and d) the flange cooperating with the first aperture, the second aperture, and the third aperture to actuate the bypass position, the shut-off position, the filter position and the back-flush function as desired.

10. The valve of claim 9 further comprising:

a) the platform having an arc of about 180 degrees and being capable of closing at least one of the lower ports;

b) a handle being secured to the cylinder oppositely disposed from the platform; and c) the handle serving to move the piston between the bypass position, the shut-off position, the filter position and the back-flush function as desired.

11. The valve of claim 10 further comprising:

a) the platform having sufficient size to contact an interior edge of the threaded portion;

b) the handle being separable from the piston;

c) the handle end of the piston being adapted to receive the handle; and d) a removable securing means for securing the handle to the handle end.

12. The valve of claim 11 further comprising:

a) the lower ports including four base ports;

b) the four base ports being formed by a second cylinder within the housing supported by four buttresses on a vertical central axis of the housing; and c) the four base ports selectively and alternatively providing communication with the back-flush port, in-flow port, and outlet port in the side of the housing.

13. The valve of claim 12 further comprising:

a) the outlet port of the housing communicating with the base of the valve only through the piston;

b) a housing O-ring for sealing the valve on the filter cylinder between the threaded portion and the upper housing;

c) the series of ports including three upper ports;

d) the three upper ports including an inlet port, an outlet port and a back flush port; and e) the lower ports selectively cooperating with the upper ports to form the bypass position, the shut-off position, the filter position, and the back-flush function.

14. The valve of claim 13 further comprising:

a) the upper ports having an exterior rounded portion on the valve housing;

b) the back-flush port extending to the inner cylinder wall;

c) a central axis of the back-flush port intersecting a central axis of the inlet port, a central axis of the outlet port and a central axis of the piston; and d) the inlet port and the outlet port having the same central axis.

15. The valve of claim 14 being applied to a water system for a building.

16. The valve of claim 14 being applied to a water system for a faucet.

17. The valve of claim 14 further comprising:

a) the upper ports having a female threaded arrangement for attachment to a water system; and b) the lower parts having an exterior male threaded portion for attachment to the filter.

18. A valve for a filtration cylinder for a water system having a housing and with a piston contained therein, comprising:

a) the housing having a series of ports including upper ports and lower ports;

b) the piston having a series of apertures;

c) the piston having a movement within the housing about an axis;

d) the upper ports having a female threaded arrangement for attachment to a water system;

e) the lower ports being adjacent to an exterior male threaded portion for attachment to the filter;

f) the apertures and the ports cooperating to form a bypass position, a shut-off position, a filter position, and a back-flush function for the piston in relation to the housing;

g) the movement being rotation of the piston within the housing about an axis;

h) the piston being movably mounted within the housing;

i) the housing having a piston receiving aperture therein;

j) the housing having a back-flush port therein as one of the upper ports;

k) the housing having a pass through port therein as one of the upper ports;

l) the piston receiving aperture having a piston axis;

m) the back-flush aperture having a back-flush axis;

n) the pass through aperture having a pass through axis; and o) the piston axis, the back-flush axis and the pass through axis being mutually perpendicular.

* * * * *

UNITED STATES PATENT AND TRADEMARK OFFICE
CERTIFICATE OF CORRECTION

PATENT NO. : 5,452,744

DATED : September 26, 1995

INVENTOR(S) : Frank J. Otto

It is certified that error appears in the above-identified patent and that said Letters Patent is hereby corrected as shown below:

On the title page, item [73] Assignee should read --Matrix IV, Inc.
A Corporation of Illinois
610 East Judd Street
Woodstock, Illinois 60098,
Part Interest--

Signed and Sealed this

Tenth Day of December, 1996

Attest:

Attesting Officer

BRUCE LEHMAN

*Commissioner of Patents and Trademarks*

UNITED STATES PATENT AND TRADEMARK OFFICE
CERTIFICATE OF CORRECTION

PATENT NO. : 5,452,744
DATED : September 26, 1995
INVENTOR(S) : Frank J. Otto

It is certified that error appears in the above-indentified patent and that said Letters Patent is hereby corrected as shown below:

On the title page, item [73] Assignee should read as follows:

One-third interest to John J. Gianfrancesco
677 Golfers Lane
Bartlett, Illinois 60103; and One-third interest to Matrix IV, Inc.
A Corporation of Illinois
610 East Judd Street
Woodstock, Illinois 60098

Signed and Sealed this

Twenty-eighth Day of July, 1998

Attest:

BRUCE LEHMAN

Attesting Officer    Commissioner of Patents and Trademarks